June 3, 1930.  G. D. BRADSHAW ET AL  1,761,177
FLUID SEPARATOR
Filed Feb. 11, 1927   2 Sheets-Sheet 1
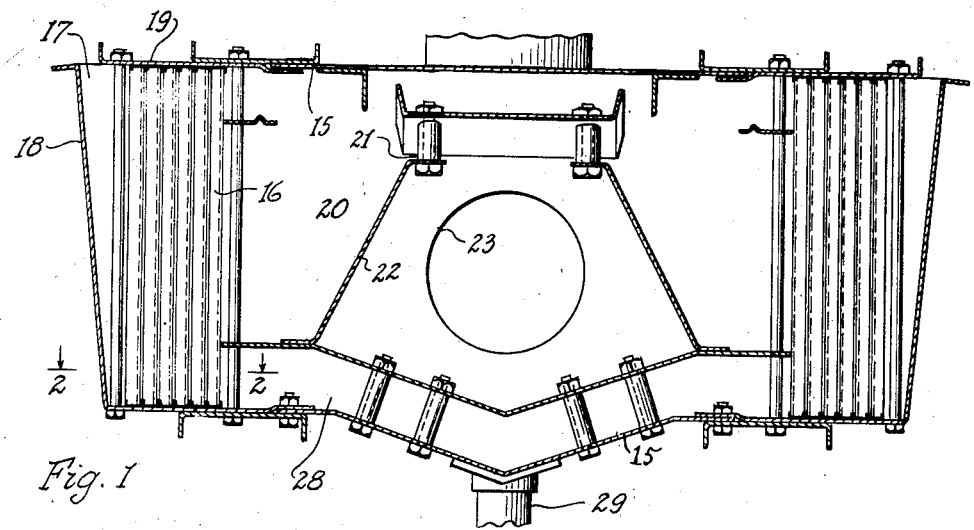
Fig. 1
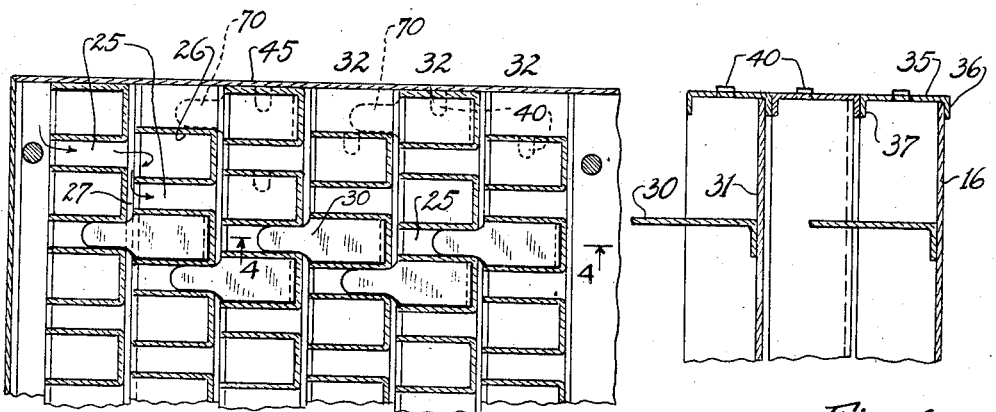
Fig. 2
Fig. 4
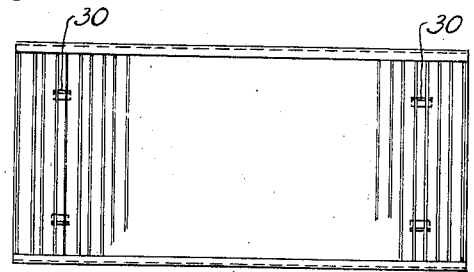
Fig. 3
INVENTORS:
Grant D. Bradshaw
Roger W. Andrews
By [signature]
Atty.

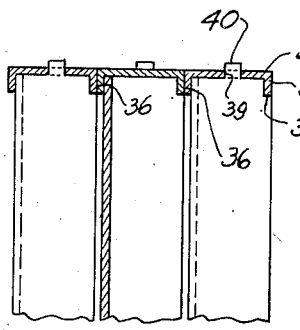
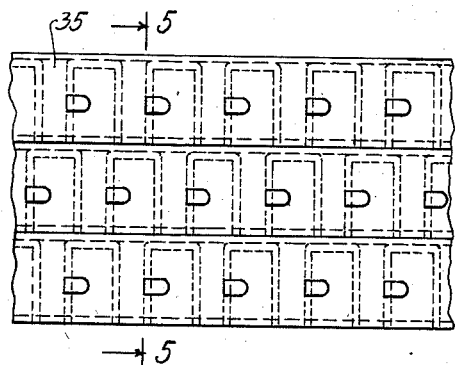
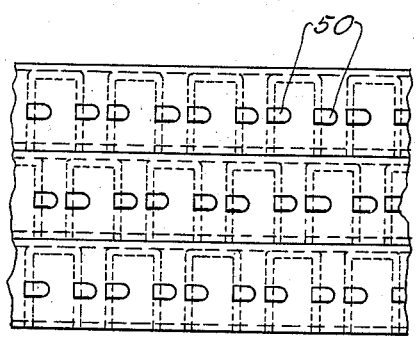
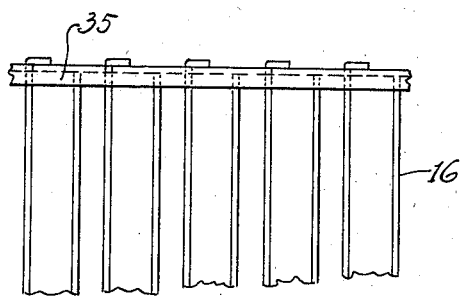
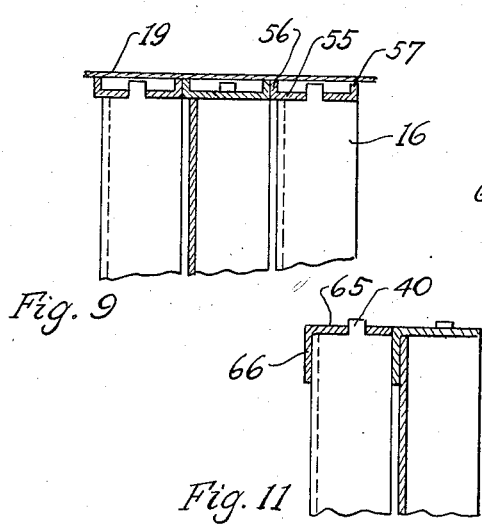
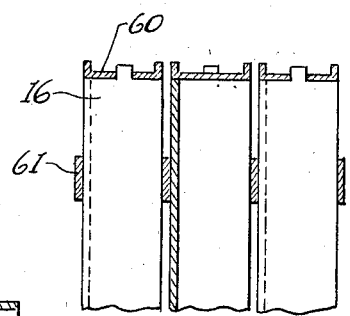

Patented June 3, 1930

1,761,177

UNITED STATES PATENT OFFICE

GRANT D. BRADSHAW, OF BEAVER, AND ROGER W. ANDREWS, OF WILKINSBURG, PENNSYLVANIA, ASSIGNORS, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed February 11, 1927. Serial No. 167,571.

This invention relates to fluid separators, and particularly to separators which have a large number of baffles that are assembled in such a manner as to force the gas to take a circuitous route in passing through the banks of baffles. The particular separator which we have illustrated and described as exemplifying our invention is what is known in the trade as the "Tracyfier", in which a large number of small trough-shaped baffles are mounted vertically in rows with the individual baffles of one row staggered with reference to those of the adjacent rows. And the object of the invention is to provide means for assembling such baffles so that they will be accurately positioned with reference to each other and will maintain those positions in spite of use, rough handling and the like.

Of the accompanying drawings Fig. 1 is a transverse sectional view of a separator which embodies the features of our invention; Fig. 2 is an enlarged fractional sectional view along the lines 2—2 of Fig. 1; Fig. 3 is a reduced side elevation of one of the banks of baffles; Fig. 4 is a fractional sectional view along the lines 4—4 of Fig. 2; Fig. 5 is a fractional sectional view along the line 5—5 of Fig. 6; Fig. 6 is a plan view of a portion of a bank of baffles with the casing plate removed; Fig. 7 is an elevation of the baffles of Fig. 6; Fig. 8 is a plan view similar to Fig. 6 showing a somewhat modified means for assembling the baffles; Figs. 9, 10 and 11 are sectional views similar to Fig. 5 showing modified means for assembling the baffles.

Referring to Fig. 1, the separator comprises a casing 15 closed at its ends and having mounted in its sides the banks of baffles 16. In operation the gas passes into the banks of baffles from the outer side. In this instance we prefer to have the gas enter the separator through openings 17, inclined plates 18 being fixed to the casing of the separator so as to force the gas to enter near the upper ends of the baffles, but the plates 18 may be omitted if desired. The top plate 19 closes the upper ends of the baffles. The gas passes downwardly from the openings 17 and into and through the banks of baffles. The gas then enters the passageway 20 and from there preferably passes through a slot 21 into an inner conduit 22 and thence out of the separator outlet 23.

In passing through the banks of baffles the gas passes, as indicated by arrows, through the spaces 25 between the baffles and thence into the troughs 26 of the next row of baffles and along through the passageways 27 and into the spaces 25 between the baffles of the next row, and so on until the entire bank of baffles has been traversed. In this circuitous passageway the moisture and other impurities in the gas owing to their greater mass, are thrown against the sides of the baffles and adhere thereto and flow downwardly to the ends of the baffles and into the water chamber 28 and thence out through the drain pipe 29.

As is well understood, the principle involved in purifying gases with separators of this nautre is to provide a circuitous and ever changing passageway for the gas so that the centrifugal force acting on the particles of moisture and other impurities may be effective in separating these impurities from the gas. As a consequence it is very desirable to avoid any so-called leakage through the baffles which results when there is any displacement of the baffles with reference to each other so as to eliminate more or less the circuitous route. The baffles in one row are staggered with reference to the baffles in the adjacent row, and, obviously, if one row should be inadvertently shifted with reference to the adjacent row the baffles in one row might not be properly staggered with reference to those in the adjacent rows, and a passageway 25 in one row might coincide more or less with a similar passage in the next row, so that the gas could pass in a fairly straight line from one row to the next.

We have found that this often occurs in the assembling, either before they are installed or afterwards; and we have provided means for preventing this displacement of the rows of baffles with reference to each other. The means which we provide for this comprise any suitable members fixed to one row and arranged to project into the spaces between the baffles or into the baffle troughs of the adjacent row or rows. Any suitable means of this nature may be provided, but we prefer to provide positioning members such as the lugs 30 which are fixed to the baffles in one of the rows and pass forwardly into coaction with one or more of the baffles of the other row. For instance, the lugs may pass into the spaces 25 between the baffles, or, if desired, these lugs may be inverted and arranged to pass into the troughs of the baffles of the adjacent row. In this instance we provide lugs 30 which are fixed to the bottoms 31 of certain baffles and are of such width as to reach from one side to the other of the baffles and of such length as to project a material distance between two adjacent baffles of the adjacent row, the outer end of the lugs being substantially the same width as the desired space between two baffles. The lugs, however, may pass forwardly opposite the ends of the adjacent rows, as indicated by the dotted lugs 70 of Fig. 2.

In assembling these baffles it is common first to assemble them in rows as hereinafter described, and then to assemble the various rows in banks. It is customary, though not at all necessary, to form the banks of six rows 32, and, in order to properly position the rows with reference to each other, we provide four lugs 30 for each row, two near the upper ends of the baffles and two near the lower ends; and, preferably, these are fixed to baffles near the outer ends of the rows. (Fig. 3.) It is to be understood, however, that the number of lugs and the position of the lugs are not material elements of our invention.

In assembling the rows of baffles into banks, the inner row 32 may be placed in position and the second row may then be positioned by passing the projecting ends of the lugs 30 between two of the baffles, as indicated in Fig. 2. The rows are spaced apart in any suitable manner, preferably in the manner hereinafter described. The next row is then positioned, other lugs 30 acting as guides; and so on until the rows are all properly assembled with reference to each other. Obviously by this means the rows will be positioned so that the baffles in one row will be exactly staggered with reference to the baffles in the other rows, and, if there is no displacement of the baffles in the rows themselves, there will be no opportunity for the gas to avoid taking the circuitous route desired.

The baffles may be assembled in rows in any suitable manner. We have found that the baffles when assembled in a well known manner are not always accurately positioned with reference to each other, and some of the baffles may become more or less tilted or inclined, and in the rows, as a consequence, there is a tendency for the steam to leak past these baffles without being properly operated on. To prevent this displacement of the baffles in the rows we prefer to provide channel irons 35 which are placed across the ends of the rows of baffles with the flanges 36 and 37 enclosing the ends of the baffles. The flange 36 is outside of the bottom of the baffle and the flange 37 is set into a recess 38 in the ends of the sides of the baffles. These irons 35 extend from one end of the row to the other, with one iron on each end of the row, and thus the baffles are snugly held in place so that twisting or tilting thereof becomes impossible under any ordinary conditions.

In order to hold the channel irons in place, and to fasten the ends of the baffles snugly to the irons, we provide openings 39 in the channel irons opposite one side of each end of each baffle and provide lugs 40 on the side of the baffles registering with these openings. In assembling, the lugs are passed through the openings and the lugs are then bent downwardly against the channel irons. In this manner, as both ends of the baffles are so connected to the respective channel irons, the baffles are all snugly held in place with reference to each other.

When the rows of baffles thus formed are assembled in the manner hereinabove described the flanges 36 form stops to limit the movement of one row towards the other and thus to space the rows apart the distance of the width of these flanges. It will hence be seen that when the assembled rows are assembled into banks as described, and are held firmly together by the sides 45 of the casing, the possibility of displacement either of the rows themselves with reference to each other or of the baffles in the rows is substantially eliminated.

Fig. 8 shows a modified manner of connecting the baffles in rows which consists in forming a lug 50 on each side of each end of the baffles and passing these lugs through holes in the channel irons, so that each side of the baffle is thus held rigidly in contact with the channel iron.

Fig. 9 shows a modification in which the channel iron 55 has the flanges 56 and 57 extending upwardly. The flange 56 preferably extends beyond the bottom of the baffle 16 and thus provides a means for spacing the rows of baffles apart when assembled. The flange 57, however, preferably has its forward edge flush with the forward edge of the baffles. This arrangement provides stiffening flanges for the channel irons 55 and also these flanges reach upwardly to the upper plate 19 and downwardly to the lower plate of the casing so that the spaces between the ends of the rows of baffles and the plates of the casing are entirely closed. This prevents leakage of gas through these spaces. When this arrangement is not provided for it is customary to close this space by means of yielding gaskets, or in some other manner.

Fig. 10 shows a modification somewhat similar to Fig. 9 except that in this instance the channel irons 60 are the same width as the depth of the baffles 16 and the spacing of the rows of baffles from each other is provided for by means of strips 61 which are fixed in any suitable manner to the bottoms of the baffles.

Fig. 11 shows another modification in which the channel irons are replaced by L irons 65, the flange 66 of which extends downwardly along the bottom of the baffle and thus provides means for spacing the rows of baffles from each other. In each of the modifications of Figs. 9, 10 and 11 it is preferable to have lugs 50 projecting through openings in the irons from each side of the baffles and at each end thereof, so as to more firmly hold the baffles in place.

Although we have herein specified channel irons for connecting the baffle ends, yet it is to be understood that any suitable metal may be used. Also the particular separator illustrated and described merely exemplifies our invention, as the invention is equally applicable to various other forms and types of separators.

We claim as our invention:—

1. A fluid separator comprising a plurality of rows of individual baffles, each of said rows comprising a strap mounted along the ends of the baffles in the row, a flange projecting angularly from one edge of each of said straps along the side of each of the baffles of the row, said rows being assembled in banks with each of said flanges positioned between two adjacent rows for maintaining the proper spaced relation of said rows, a second flange projecting angularly from the other edge of each of said straps along the opposite side of each baffle, each of said baffles having a recess on said opposite side extending to the end of the baffle into which said second flange projects.

2. A fluid separator comprising rows of individual baffles, said baffles being elongated and trough shaped with their ends in line, a strap mounted across said ends, said strap having a stiffening flange projecting angularly along one edge, and said strap having openings therethrough registering with the ends of the walls of said baffles, and lugs projecting from said baffle ends and through said openings, each of said straps having a second flange projecting angularly from its other edge, and arranged to properly space apart the adjacent rows of the separator.

3. A steam separator comprising a bank of baffles, said bank comprising rows of individual elongated baffles, a metal strap positioned along the ends of the baffles of each of said rows, means connecting each of said baffles to said strap, flanges projecting angularly from each edge of each strap and clasping the end of each baffle, said rows being assembled with said flanges maintaining them in proper spaced relations, and means projecting from each row into an adjacent row for maintaining the baffles in each row properly staggered relative to the baffles of the adjacent rows.

4. A fluid separator comprising a plurality of rows of baffles assembled to form banks of baffles, and positioning members fixed to some of the rows and projecting into adjacent rows for determining and maintaining the proper relative position of the adjacent rows, said rows comprising elongate baffles spaced apart, and in which each of said positioning members has one portion between and in contact with the sides of the same baffle in one row, and another portion between and in contact with the sides of two adjacent baffles in the adjacent row.

In testimony whereof we hereunto set our hands.

GRANT D. BRADSHAW.
ROGER W. ANDREWS.